United States Patent [19]
Bailey

[11] 3,972,119
[45] Aug. 3, 1976

[54] CHAIN SAW WITH A BIFURCATED DIAPHRAGM MEANS PROVIDING A COAXIAL VIBRATION-ISOLATING UNIT

[75] Inventor: Jay Richard Bailey, Chatsworth, Calif.

[73] Assignee: McCulloch Corporation, Los Angeles, Calif.

[22] Filed: Aug. 25, 1975

[21] Appl. No.: 607,452

[52] U.S. Cl. ............................... 30/381; 267/137; 173/162
[51] Int. Cl.² ...................... B27B 17/00; F16F 1/36
[58] Field of Search ............ 30/381, 382, 383, 384, 30/385, 386; 173/162; 267/137

[56] References Cited
UNITED STATES PATENTS

| | | | |
|---|---|---|---|
| 3,690,640 | 9/1972 | Pineau | 267/137 |
| 3,728,793 | 4/1973 | Makinson | 30/383 |
| 3,813,776 | 6/1974 | Frederickson | 30/381 |
| 3,831,920 | 8/1974 | Meldrum | 267/137 |
| 3,845,827 | 11/1974 | Schulin | 173/162 |
| 3,911,580 | 10/1975 | Bailey | 30/381 |

Primary Examiner—Al Lawrence Smith
Assistant Examiner—J. C. Peters

[57] ABSTRACT

A vibration-isolation system uniquely adapted for use in connection with chain saws where vibration-isolation units resiliently interconnect a vibration-generating engine and cutter chain assembly with an inertia-providing handle assembly. The improvement of the invention resides in a bifurcated, resilient diaphragm means constituting at least one such vibration-isolating unit. The improved bifurcated, resilient diaphragm means includes a resilient, generally annular base and first and second axially displaced, first and second resilient generally toroidal segments located on opposite sides of a generally annular, vibration and deflection-accommodating recess means. The bifurcated diaphragm means may also be considered as including a resilient, generally annular base, with first and second resilient, generally annular rim means being supported by first and second resilient cantilever means located on opposite axial sides of the generally annular, vibration and deflection-accommodating recess means.

16 Claims, 6 Drawing Figures

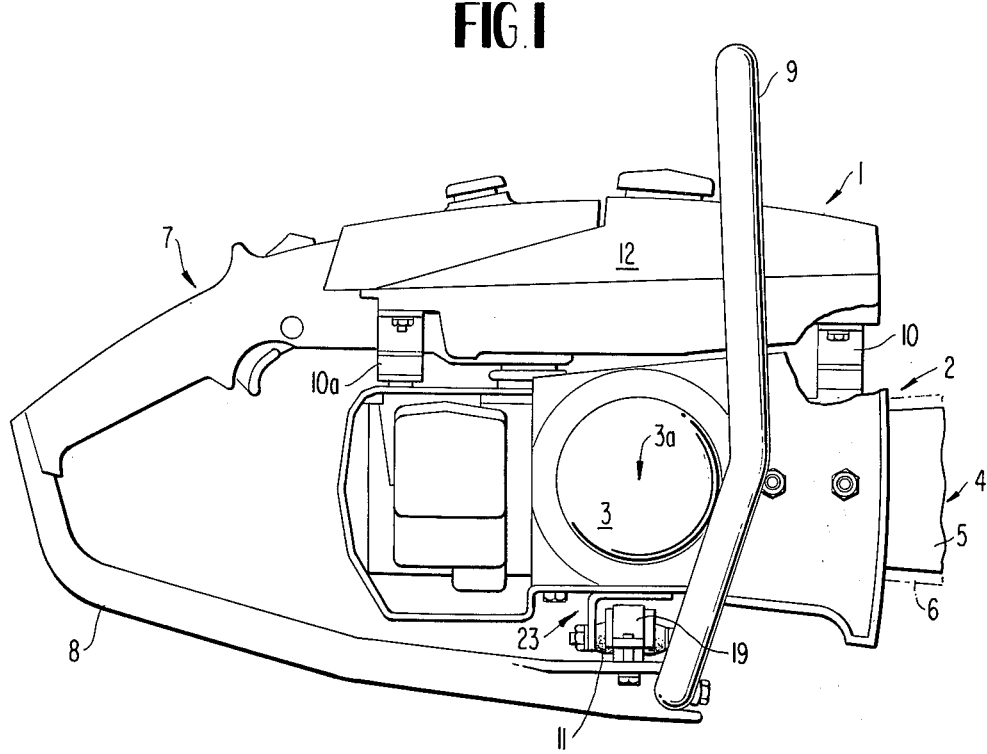
FIG.1
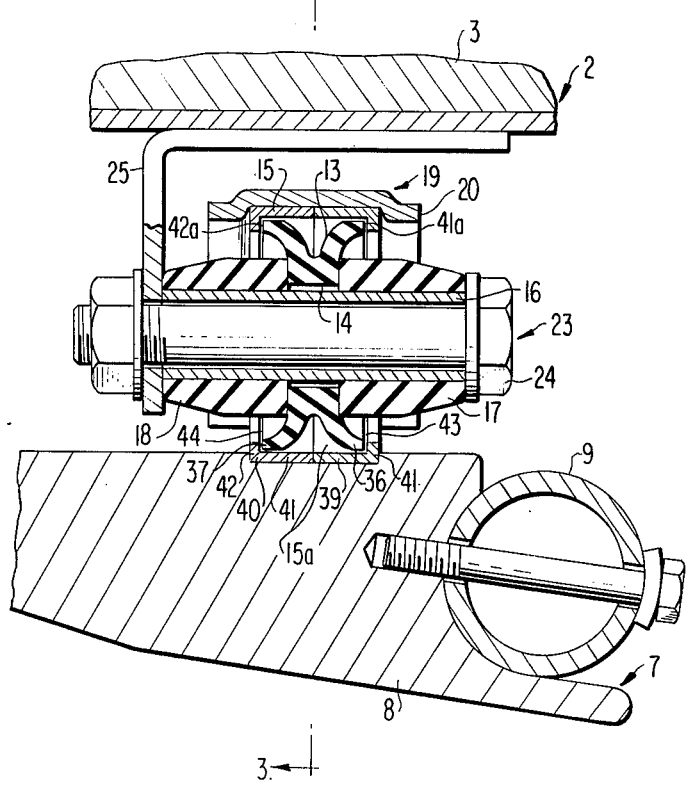
FIG.2
FIG.3

CHAIN SAW WITH A BIFURCATED DIAPHRAGM MEANS PROVIDING A COAXIAL VIBRATION-ISOLATING UNIT

GENERAL BACKGROUND AND SUMMARY OF INVENTION

The present invention is directed to vibration-isolation systems which are employed where there is a need to provide low cost, dependable, antivibration or vibration-isolating elements, especially where these elements must be mounted in a confined or small space and have quite low spring constants.

The invention finds particular utility in connection with vibration-isolation units which are employed to resiliently mount a chain saw engine and cutter chain assembly in a cradle-like support provided by a handle and inertia assembly.

Such composite, vibration-absorbing chain saws are featured, for example, in Frederickson et al. U.S. Pat. No. 3,542,095 (Nov. 24, 1970); Frederickson et al. U.S. Pat. No. 3,698,455 (Oct. 17, 1972); Frederickson et al. U.S. Pat. No. 3,813,776 (June 4, 1974); Bailey U.S. Pat. No. 3,845,557 (Nov. 5, 1974); and United States Bailey et al. application Ser. No. 485,424, filed July 3, 1974, entitled "Coaxial Vibrating Isolation Unit for a Chain Saw Including Discrete, Independently Operable Elements" and assigned to the assignee of the present invention.

In particular, the present invention constitutes the provision of a coaxial-type or resilient diaphragm, vibration-isolating unit uniquely suited, for example, to constitute a lowermost resilient mount interposed between a chain saw handle and the underside of a chain saw engine assembly. This invention incorporates and retains the improvements in the chain saw vibration-isolating art as disclosed and claimed in the aforesaid Frederickson et al. U.S. Pat. No. 3,542,095, and the aforesaid Frederickson et al. U.S. Pat. No. 3,813,776.

To the extent appropriate in connection with the present invention, the disclosure of the aforesaid U.S. Pat. Nos. 3,542,095; 3,698,455; 3,817,776, and 3,845,557, and the aforesaid Bailey et al. application Ser. No. 485,424 are herein incorporated by reference.

The present invention entails the use of a unique, bifurcated, resilient diaphragm structure which is characterized by a remarkably low spring rate which, in both axial and radial directions of vibration, may have a spring rate on the order of only about 50 pounds per inch.

Such an improved spring constant serves to lower the engine speeds where resonant vibration occurs, to speeds well below normal chain saw engine idling speeds and materially reduces vibrations which are transmitted through chain saw handle means to an operator during normal cutting speeds.

Indeed, with the present invention, the highest acceleration encountered over most of the chain saw cutting speed range was somewhere on the order of only about 3 G.

This reduced acceleration level is believed to be about half or less of that previously encountered with chain saw vibration-isolating systems.

This marked improvement in spring rate and acceleration characteristics of a chain saw vibration-isolating element is achieved in the context of a chain saw having a vibration-generating or vibration assembly which includes an engine having a crank shaft and a cutter chain means which traverses a cutting path about a guide bar. The chain saw further includes a support means including handle means which are to be grasped by a chain saw operator. Also included in the chainn saw are a plurality of vibration-isolating means which interconnect the vibration assembly and the support means, with at least one of the vibration means including resilient diaphragm means having an aperture extending transversely of the cutting path.

The shaft means passes through the aperture of the diaphragm means, with the diaphragm means being journaled upon the shaft means.

A first, resilient, impedance means is mounted on the shaft means and is operable to abuttingly and separably engage one side of the diaphragm means. A second, resilient, impedance means, also mounted on the shaft means is operable to abuttingly and separably engage an opposite side of the diaphragm means.

A first mounting means connects the diaphragm means with one of the vibrating assembly and support means while a second mounting means connects the shaft means with the other of the vibrating assembly and support means.

In the context of this chain saw environment, the improvement of the present invention resides in a bifurcated diaphragm means structure including a resilient, generally annular base means which is telescopingly mounted in the shaft means and located on the shaft means generally axially between the first and second impedance means. A first, resilient, generally toroidal segment means is disposed generally outwardly of and supported by the generally annular base means and is generally engageable with the first mounting means. A second, resilient, generally toroidal segment means is disposed generally outwardly of and supported by the generally annular base means and is also generally engageable with the first mounting means.

The bifurcated diaphragm means further includes a generally annular vibration and deflection-accommodating recess means which is located generally between the first and second generally toroidal segment means and encircles the generally annular base means.

The first generally toroidal segment means cooperates with the second generally toroidal segment means to define a bifurcated diaphragm means extending generally between the first and second mounting means.

Defined in a somewhat different sense, the bifurcated diaphragm means of the present invention may be considered as comprising resilient, generally annular base means telescopingly mounted on a shaft means and located on the shaft means generally axially between first and second impedance means. In this definitional aspect of the invention, a first resilient, generally annular, rim means may be considered to be spaced from the generally annular base means, as is a second resilient, generally annular rim means.

A first resilient cantilever means may be considered to be connected with the generally annular base means and resiliently support the first resilient generally annular rim means generally outwardly of the central axis of the generally annular base means. Similarly, a second resilient cantilever means may be considered as resiliently supporting the second resilient generally annular rim means generally outwardly of the central axis of the generally annular base means.

In this alternatively defined form of the invention, a generally annular, vibration and deflection-accommodating recess means is located generally between the first and second resilient generally annular rim means. The first, resilient, generally annular rim means and first, resilient, cantilever means cooperate with the second, resilient, generally annular rim means and the second, resilient cantilever means to define a generally bifurcated diaphragm means.

An independently significant facet of the invention, independent of the preferred chain saw context of the invention, and involving either of the aforegoing definitional approaches to the invention, entails the combination of the aforesaid bifurcated diaphragm means, mounted on a shaft means between first and second impedance means. This combination is believed to be applicable to vibration-isolating location and mounting arrangements other than that heretofore described and is further believed to be advantageously operable in a variety of contexts other than chain saws.

Other independently significant facets of the invention, in the context of either definitional approach, reside in features such as a generally V-shaped cross-section for the vibration and deflection-accommodating recess means, the provision of generally annular lip means on each of the first and second generally toroidal segments which are axially and radially engageable with the first mounting means, and radial clearances between the diaphragm means and either or both of the shaft means and first mounting means and axial clearances between the axial extremities of the bifurcated diaphragm means and the first mounting means.

Such independent significant is also attached to the manner in which the resilient diaphragm means, while undergoing the imposition of radially directed forces, is operable to resiliently absorb vibrations by torus bending, shear, hoop compression and axial compression and resiliently absorb vibrations while undergoing axially applied force by torus bending, shear, hoop tension and axial compression.

A further and similarly independent, significant facet of the invention resides in a unique cushioning or "bumper" mechanism which is intended to limit or resiliently cushion radial engagement between the generally annular base means and the first mounting means. In a preferred embodiment, this cushioning or bumper structure comprises a resilient O-ring means which encircles the generally annular base means and is disposed generally axially between the first and second generally toroidal segment means (i.e., between the first and second resilient cantilever means).

In describing the invention, by way of example, but not by way of limitation, reference will be made to a preferred embodiment illustrated in the appended drawings, along with details of a modified form of the preferred embodiment provided with a cushioning or bumper mechanism.

DRAWINGS

A presently preferred embodiment of the invention, including a modified form of this embodiment provided with a cushioning or bumper mechanism, is set forth in the appended drawings wherein:

FIG. 1 provides a fragmentary, schematic, side elevational view of a handle and engine portion of a chain saw, illustrating the general disposition of vibration-isolating components;

FIG. 2 provides an enlarged, side elevational view of a vibration-isolating unit of the present invention which may be incorporated between the underside of the engine assembly depicted in FIG. 1 and the upper side of a lower handle assembly, the sectional view being taken along a plane running longitudinally of the chain saw through the center axis of the vibration-isolating unit;

FIG. 3 provides a further enlarged, transverse cross-sectional view of the vibration-isolating unit depicted in FIG. 2, as viewed along section line 3—3 of FIG. 2;

FIG. 4 provides a further enlarged, perspective view of the bifurcated diaphragm component of the FIG. 2 assembly;

FIG. 5 provides an enlarged, elevational, cross-sectional view of the vibration-isolation unit depicted in FIG. 2, provided with an auxiliary cushioning or bumper mechanism; and FIG. 6 provides a still further enlarged, fragmentary, elevational, cross-sectional view of a portion of one toroidal segment of the FIG. 2-3 vibration-isolating unit, depicting the various phenomena which serve to resiliently absorb vibrations during axial and radial movement of the shaft supporting the vibration-isolating diaphragm relative to a ring-like mounting means, within which the outer periphery of the bifurcated diaphragm means is housed.

DETAILED DESCRIPTION OF INVENTION

Chain Saw Embodiment

Figure 4:
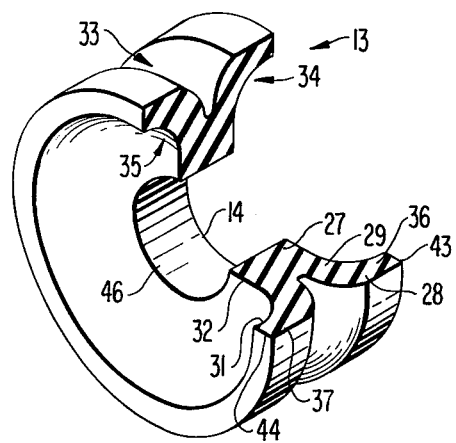

FIG. 1 provides a fragmentary side elevational view of a representative chain saw 1. Chain saw 1 is of the general type featured, for example, in the aforesaid Frederickson et al. U.S. Pat. Nos. 3,542,095 and 3,813,776.

Chain saw 1 includes a vibration-generating assembly 2 which is characterized by a drive engine 3 and a cutter assembly 4. Cutter assembly 4 includes a guide bar 5 and a cutter chain 6 mounted on the periphery of the guide bar 5 for endless traversal through a cutting path 5a, in a manner well understood in the chain saw art. Cutter chain 6 is driven by engine 3 through a drive mechanism of the type now used in the chain saw art.

Engine 3, in a presently available commercial chain saw embodiment, would have a crankshaft having an axis of rotation 3a extending transversely of, and perpendicular with respect to, the longitudinal plane of the cutting path 5a, defined by the periphery of guide bar 5.

Chain saw 1 further includes a cradle-like, handle assembly 7. Assembly 7 comprises a longitudinally extending, U-shaped handle portion 8 and a transversely extending handle 9. Handle means 9 may fully or partially, transversely circumscribe the engine-cutter assembly 2.

Vibration-generating assembly 2 is resiliently supported within the cradle or support means 7 by a plurality of vibration-isolation units. These units preferably are generally aligned with a plane extending generally centrally and longitudinally of the assembly 2, in the manner described and claimed, for example, in Frederickson et al. U.S. Pat. No. 3,542,095. Thus, as shown in FIG. 1 of the present disclosure, vibration-generating assembly 2 may be supported by three vibration-isolation units 10, 10a and 11.

Vibration units 10 and 10a are interposed between the upper portion of the engine assembly 3 and the lower portion of a fuel tank assembly 12 incorporated in the cradle means 7. Fuel tank assembly 12, in the manner generally described in the Frederickson et al.

U.S. Pat. No. 3,542,095, provides a significant inertia or vibration-dampening function.

Structural characteristics of representative vibration-isolation units 10 and 10a are discussed in the aforesaid Frederickson et al. U.S. Pat. Nos. 3,542,095; 3,652,074; 3,698,455 and 3,813,776.

Structural and mounting characteristics of a vibration-isolation assembly having a generic relationship to the vibration-isolating assembly 11 of the present invention are disclosed in detail in the aforesaid Frederickson et al. U.S. Pat. No. 3,813,776.

Prior to describing advantageous and novel structural characteristics of the vibration-isolation unit 11 of the present invention, it is deemed appropriate to here review structural and operational aspects of the vibration-isolation unit 11 which are related generically to the vibration-isolation system disclosed and claimed in the aforesaid Frederickson et al. U.S. Pat. No. 3,813,776.

Generic Aspects

As shown in FIGS. 1–3, vibration-isolation unit 11 includes a resilient, disc-like diaphragm means 13. This diaphragm means 13 has an aperture 14 which extends transversely of the cutting path 5a defined by chain 6 and which also preferably extends parallel with the axis of rotation 3a of the crankshaft of engine 3. Diaphragm means 13 is fabricated of rubber, neoprene or other elastomeric, resilient material and is supported within a split cylinder-like, metallic ring or sleeve 15.

A hollow shaft means 16 passes through the aperture or central opening 14 of the diaphragm means 13, with this diaphragm means 13 being journaled upon the shaft means 16 as generally shown in FIGS. 2 and 3.

A first, generally annular, impedance means 17, mounted on the shaft means 16, may abuttingly and separably engage one side of the diaphragm means 13 as shown in FIG. 2. A second, generally annular, impedance means 18, mounted on the shaft means 16, may abuttingly and separably engage an opposite side of the diaphragm means 13, as is also shown in FIG. 2. Each of the impedance means 17 and 18 may be fabricated of elastomeric or plastic material, as shown, or in certain instances may comprise integral, metallic abutment portions of the shaft means 16.

A first mounting means 19 connects the diaphragm means 13 and diaphragm housing ring 15, with one of said vibrating assembly 2 and the support means 7. In the FIG. 1–3 arrangement, mounting means 19 comprises a C-clamp 20 which secures diaphragm ring or sleeve 15 to support means 7 via clamping bolts 21 and 22. A second mounting means 23 connects the shaft means 16 with the other of the vibrating assembly and support means 7. In the illustrated embodiment, mounting means 23 comprises a threaded bolt, nut and washer assembly 24 which connects shaft 16 to flange 25 which depends downwardly from the underside 26 of the housing of engine 3.

This representative mounting arrangement, presented by way of example only, is also described in greater detail in U.S. Pat. No. 3,813,776.

Generic aspects common to the present invention and that of the aforesaid Frederick et al. U.S. Pat. No. 3,813,776 having been described, it is now appropriate to consider distinguishing and innovative structural and operational aspects of the bifurcated diaphragm means 13 which characterize the present invention.

Characterizing Features of Improved Bifurcated Diaphragm Means

The bifurcated diaphragm means 13 of the coaxial vibration-isolating mount 11, which diaphragm means characterizes the present invention, is depicted in detail in FIGS. 2–6.

As depicted in these figures, bifurcated diaphragm means 13 comprises a unitary elastomeric structure fabricated from rubber (artifical and/or natural) or plastic material. In the presently preferred embodiment, bifurcated diaphragm means 13 may be fabricated from neoprene SC 425A1, B, J material.

Bifurcated elastomeric diaphragm means 13 includes a resilient, generally annular base means 27. Base means 27 is telescopingly mounted on shaft means 16 and is located on shaft means 16 generally axially between first impedance means 17 and second impedance means 18.

Figure 5:
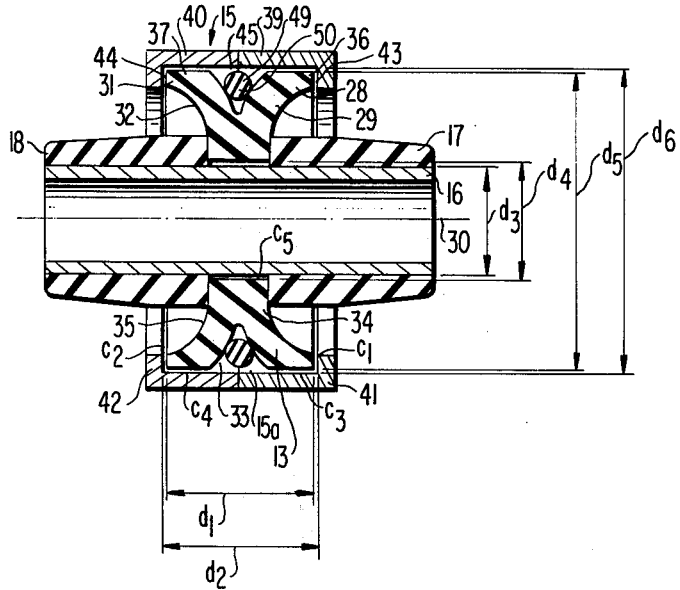

As is depicted for example in FIGS. 2 and 5, resilient, generally annular base means 27 may be disposed in generally snug or generally contiguous relation with first impedance means 17 and second impedance means 17 and second impedance means 18 insofar as axial relationships between these components are concerned.

Bifurcated diaphragm means 13 further includes a first, resilient, generally annular rim means 28 which is spaced generally radially and axially outwardly from base means 27. A first, annular, generally concave, disc-shaped resilient cantilever means 29 is connected with base means 27 and projects outwardly therefrom. Cantilever means 29 resiliently supports the first resilient generally annular rim means 28 generally outwardly of a common central longitudinal axis 30 of base means 27 and shaft means 16 (assuming the diaphragm means 13 and shaft means 16 are generally coaxially arranged as depicted in FIGS. 2 and 5). Cantilever means 29, as shown in FIGS. 2 and 5, is connected with the base means 27 and rim means 28 in an integral sense, i.e., these components are all formed as a unitary portion of bifurcated diaphragm means 13.

A second, resilient, generally annular rim means 31 is spaced generally radially and axially outwardly from base means 27. A second resilient, generally concave, disc-shaped cantilever means 32 resiliently supports rim means 31 generally radially outwardly of central axis 30 of shaft means 16 and base means 27 (recognizing that the axes of these components may be coaxially arranged when these components are depicted as shown in FIGS. 2 or 5 and further recognizing that the axes of these components may be somewhat displaced in light of clearances between the diaphragm means 13 and the shaft means 16 as hereinafter described).

A generally annular, vibration and deflection-accommodating recess means 33 is located generally axially between the first rim means 28 and the second rim means 31.

The first rim means 28 and the first cantilever support means 29 cooperate with the second rim means 31 and the second cantilever support means 32 to define the generally bifurcated diaphragm means 13.

Moreover, the first rim means 28 and the first cantilever support means 29 cooperate to define a first, resilient, generally toroidal quarter segment means 34.

Somewhat similarly, but in a mirror image relationship sense in relation to the first toroidal segments 34, the second rim means 31 and second cantilever support means 32 cooperate to define a second, resilient, generally toroidal, quarter segment means 35.

As is illustrated, toroidal segment means 34 and 35 face oppositely outwardly in relation to annular base means 27.

Thus, the first resilient, generally toroidal segment means 34 and the second resilient, generally toroidal segment means 35 are disposed on generally opposite sides of the recess means 33, are mutually diverging and oppositely facing, and cooperate to define the generally bifurcated nature of the diaphragm means 13.

Recess and Rim Means Characteristics

As is generally depicted in FIGS. 2 and 5, the generally annular, vibration and deflection-accommodating recess means 33 has a generally V-shaped cross-section in a plane extending generally longitudinally of the central axis 30 of the generally annular base means 27.

The first toroidal segment means 34 includes a first annular rim means 28 in the form of a first generally annular lip means 36 disposed generally radially and axially outwardly of base means 27.

Similarly, the second annular rim means 31 of the second toroidal segment means 35 provides a second generally annular lip means 37 disposed generally radially and axially outwardly of base means 27.

As is depicted in the drawings, the first mounting means 19, which may be considered as including the axially split ring means 15, serves to peripherally house and thereby mount the lip means components 36 and 37 of the diaphragm means 13.

The second mounting means 23 serves to connect the base means 27 of diaphragm means 13, with the vibration-generating assembly 2, while the first mounting means 19 serves to connect the toroidal segments 34 and 35 of the diaphragm means 13 with the handle and support assembly 7.

Keeping in mind these general mounting concepts, at this juncture, it is appropriate to give further consideration to details of the mounting arrangement between the diaphragm means 13 and the first mounting means 19 and second mounting means 23.

Generally Preferred Mounting Arrangement for Bifurcated Diaphragm Means

Certain clearance characteristics in relation to the mounting of the bifurcated diaphragm means 13 in the composite, first mounting means 19 — second mounting means 23 are believed to significantly contribute to improved and reduced spring constant characteristics of the present invention.

Before discussing such clearance characteristics, however, it is deemed appropriate to give further consideration to structural characteristics of a preferred arrangement of the annular ring means 15.

As is depicted in FIGS. 2 and 5, ring means 15 may comprise axially separable, half ring segments 39 and 40 separably joined at axially central juncture 41 (which may be appropriately configured with mating edges to facilitate axial assembly of these ring halves).

As is depicted in FIGS. 2 and 5, ring means 15 provides a radially inwardly facing groove means 15a which is located axially between first, radially inwardly projecting rim means 41 and second, radially inwardly projecting rim means 42. Rim means 41 and 42 are disposed axially outwardly of, i.e., on opposite axial extremities of lip means 36 and 37, respectively, and are axially engageable with extremity 43 of lip means 36 and axial extremity 44 of lip means 37.

The axial distance $d_1$ between the axial extremities 43 and 44 of the first and second generally annular lip means 36 and 37 is somewhat less than the axial distanct $d_2$ between the first and second rim means 41 and 42, as depicted in FIG. 5.

As shown, surfaces 43 and 44, as well as the inner faces 41a and 42a of rims 41 and 42 extend radially of axis 30 and are annular and flat in character.

It is also believed preferable that the inner diameter $d_3$ of the cylindrical aperture 14 of the base means 27 exceed the outer diameter $d_4$ of the cylindrical shaft means 16.

Moreover, in the presently preferred embodiment, it is deemed desirable that the outer diameter $d_5$ of each of the cylindrical outer peripheries of lips 36 and 37 of the first and second generally toroidal segment means 34 and 35 be somewhat less than the inner diameter $d_6$ of the groove-defining, cylindrical surface means 45 of the ring means 15, i.e., the inner diameter of the first mounting means 19.

When diaphragm means 13, shaft means 16 and ring means 15 are coaxially arranged as depicted in FIG. 5, i.e., mutually radially and axially centered, these dimensional characteristics will provide a series of nominal clearances $c_1$ through $c_5$.

Of these clearances, $c_1$ constitutes axial clearance between diaphragm lip extremity 43 and rim 41, while clearance $c_2$ is provided between diaphragm lip 44 and mounting rim 42.

Radial clearance $c_3$ is provided between lip 36 and ring surface means 45 while clearance $c_4$ is provided between ring surface means 45 and lip 37.

Radial clearance $c_5$ is provided between inner cylindrical surface 46 of diaphragm aperture 14 and outer cylindrical surface 47 of shaft means 16.

As will be understood, in the assembled vibration-isolation unit 11, the diaphragm means 13 will not generally be completely centered as depicted in the drawings. Thus, there will probably be contact between the diaphragm means 13 and the shaft means 16 and ring means 15 at one or more locations, such that the clearances heretofore described will not generally appear in the symmetric, totally centered relationships depicted. Indeed, depending on component positions, some clearances may be eliminated as others become enlarged.

With the overall structural and preferred clearance arrangements of the diaphragm means 13 having been depicted, it is now appropriate to consider the various interacting shock or vibration-absorbing phenomenon which are believed to synergistically cooperate and provide the uniquely low spring constant and acceleration characteristics of the bifurcated diaphragm means 13.

Interacting Mode of Vibration-Absorption

Figure 6:
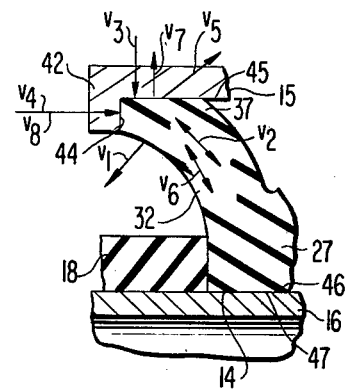

FIG. 6, in a schematic and fragmentary manner, depicts the various forces interacting between the shaft means 16, the toroidal segment 35, and mounting ring means 15 in relation to the upper left quadrant of the diaphragm means 13 as depicted generally in FIG. 5. It will here be understood that, with respect to the ensuing discussion, similar phenomenon are believed to take place in the other three quadrants of the diaphragm means 13.

While the resilient bifurcated diaphragm means 13 is undergoing the imposition of force caused by relatively radial movement between the second mounting means 23 and the first mounting means 19 in the sense that the shaft means 16 and the ring means 15 are mutually converging in the FIG. 6 view, the diaphragm means 13 is operable to resiliently absorb vibration by virtue of what are believed to be the combination of the following synergistically interacting phenomenon:

1. At least partially radially directed torus bending of the toroidal segment means 35, generally depicted by the vector $v_1$;
2. Shear in the toroidal segment means 35, generally depicted by the vector $v_2$ and occurring primarily within the body of the segment as a result of the aforesaid torus bending vector $v_1$;
3. Hoop compression in the toroidal segment means 35, generally depicted by the vector means $v_3$; and
4. Generally axially directed compression acting on the toroidal segment means 35 and generally depicted by the vector $v_4$.

These various interacting phenomenon occur as a result of the mutual convergence of the shaft means 16 and the mounting ring means 15, tending to induce radial abutting engagement of the shaft means surface 47 and the ring surface means 45 with inner and outer radial extremities 46 and 48 of the quadrant of the diaphragm means 13 depicted in FIG. 6. This engagement tends to induce generally counterclockwise-induced deflection or bending of the upper quadrant of the toroidal segment means 35 depicted in FIG. 6. Such deflection of course will tend to cause the ring rim 42 to compressably engage the extremity 44 of the lip 37, as well as cause compressive interengagement between the ring surface means 45 and the radial periphery 48 of the lip 37.

As will be appreciated, during such converging movement as depicted in FIG. 6, equivalent phenomenon as heretofore described with respect to the left upper quadrant of the bifurcated diaphragm means would take place in relation to the right upper quadrant of the bifurcated diaphragm means 13. Similarly, during relative converging movement of the shaft means 16 and the lower portion of the mounting ring means 15, similar phenomenon will occur in relation to the lower left and right quadrants of the bifurcated diaphragm means 13.

While the resilient diaphragm means 13 is undergoing the imposition of force caused by relative axial movement between the second mounting means 23 and the first mounting means 19, and where this axial movement entails relative leftward movement of the shaft means 16 with respect to the mounting ring means 15, the upper left quadrant of the diaphragm means 13 depicted in FIG. 6 is operable to resiliently absorb vibrations through a combination of what are believed to be the following synergistically interacting phenomena:

1. At least partially axially directed torus bending of the toroidal segment means 35 as generally depicted by the vector $v_5$;
2. Shear within the body of toroidal segment means 35 resulting from the torus bending represented by vector $v_5$ and depicted in FIG. 6 by vector $v_6$;
3. Hoop tension in the toroidal segment means 35 depicted by the vector $v_7$;
4. Generally axially directed compression acting on the toroidal segment means 35 and generally depicted by the vector $v_8$.

These interacting vibration-energy-absorbing phenomena result from relative leftward movement of the shaft means 16, whereby the impedance means 17 shifts the diaphragm means 13 to the left relative to mounting ring means 15 so as to cause the lip surface 44 of the toroidal segment 35 to be brought into axial abutting engagement with the rim 42 of the mounting ring means 15. This engagement of course will tend to induce generally clockwise-directed deflection or bending of the toroidal segment means, exerting compression of the face 44.

The phenomenon heretofore described with respect to the upper left quadrant of the toroidal segment means will concurrently occur in relation to the lower left quadrant of the toroidal segment means 35.

Similar phenomenon will occur in the upper and lower right quadrants of the toroidal segment means 34 when the shaft means 16 is caused to undergo relative rightward movement with respect to the ring means 15 as depicted generally in FIGS. 5 and 6.

Modified Embodiment Including Cushioning or Bumper Mechanism

FIG. 5 illustrates a modified form of the invention where a cushioning or bumper mechanism is interposed between the ring means 15 and the resilient annular base means 27 for the purpose of cushioning or absorbing radially directed engagement between these components.

The resilient bumper means 49 comprises annular resilient bumper means constituting resilient cushioning means, encircling the generally annular base means 27 and disposed generally axially between the first and second cantilever means 29 and 32 of the first and second toroidal segment means 34 and 35.

Resilient annular bumper means 49 may comprise, as shown in FIG. 5, an O-ring 50 fabricated from elastomeric material such as rubber or neoprene. O-ring 50 is mounted in the recess means 33, preferably generally in the base of this recess means, so as to provide some clearance between the outer periphery of the bumper means and the inner periphery 45 of the ring means 15. This clearance is operable to accommodate some unimpeded relative radial movement between these components.

However, when excessive radial movement occurs between the diaphragm means 13 and the ring means 15, the O-ring 50 is operable to resiliently cushion radial movement-induced engagement between the generally annular base means 27 and the ring means 15 of the first mounting means 19 so as to avoid damage and excessive vibrational movements.

While the detachable O-ring embodiment of the bumper means 50 is believed to be particularly advantageous, in that it does not interfere with or modify the basic structure of the bifurcated diaphragm means 13, it is possible that under certain circumstances, it may be appropriate and desirable to mold an annular resilient bumper means in the recess means 33 between the rim-supporting cantilever means 29 and 32.

Major Advantages and Overall Scope of Invention

Principal advantages of the invention reside in the manner in which the bifurcated diaphragm means, as heretofore described, provides uniquely reduced spring rates and accelerations during vibration of the vibration assembly 2 of the chain saw 1.

Further advantages are attributable to the fact that such improvements in vibration characteristics are achieved in a minimal space.

It is also deemed significant that such improvements are attained while retaining good overall handling and "steering" characteristics for the chain saw 1 during various cutting operations.

As will here be appreciated, the present invention constitutes a marked and unobvious departure from the opposing cone arrangements featured in such patents as Stihl et al. U.S. Pat. No. 3,651,839 (Mar. 28, 1972), Sherwood, Jr., et al. U.S. Pat. No. 3,637,029 (Jan. 25, 1972), and Makinson et al. U.S. Pat. No. 3,728,793 (Apr. 24, 1973).

Moreover, prior art exemplified by patents such as Stihl French Pat. No. 2,149,919 (Mar. 5, 1973), Elder et al. U.S. Pat. No. 3,552,785 (Jan. 5, 1971) and Kaemmerling U.S. Pat. No. 2,478,108 (Aug. 2, 1949), which disclose concave, elastomeric web support arrangements, wholly fail to recognize the bifurcated diaphragm means concept of the present invention, including the use of some or all of the clearance concepts heretofore noted and thus negate and teach away from the present invention.

Having described the advance in the art presented through this invention, it will be appreciated that those familiar with this disclosure and skilled in the chain saw and vibration-isolation art may recognize additions, deletions, substitutions or other modifications which would fall within the purview of the invention as set forth in the appended claims.

What is claimed is:

1. In a chain saw having
   a vibrating assembly including
     an engine having a crankshaft, and
     cutter chain means traversing a cutting path;
   support means including
     handle means; and
   a plurality of vibration isolation means interconnecting said vibrating assembly and support means, with at least one of said vibration means including resilient diaphragm means having an aperture, extending transversely of said cutting path, and extending generally parallel with the axis of rotation of said crankshaft;
   shaft means passing through said aperture of said diaphragm means, with said diaphragm means being journaled upon said shaft means;
   first, resilient, impedance means, mounted on said shaft means, and abuttingly and separably engaging one side of said diaphragm means;
   second, resilient, impedance means, mounted on said shaft means, and abuttingly and separably engaging an opposite side of said diaphragm means;
   first mounting means connecting said diaphragm means with one of said vibrating assembly and said support means; and
   second mounting means connecting said shaft means with the other of said vibrating assembly and said support means;
   the improvement residing in said diaphragm means and comprising:
     resilient, generally annular base means telescopingly mounted on said shaft means and located on said shaft means generally axially between said first and second impedance means;
     first, resilient, generally toroidal segment means disposed generally outwardly of and supported by said generally annular base means and generally engageable with said first mounting means;
     second, resilient, generally toroidal segment means disposed generally outwardly of and supported by said generally annular base means and generally engageable with said first mounting means;
     generally annular, vibration and deflection-accommodating recess means located generally between said first and second generally toroidal segment means and encircling said generally annular base means;
     said first generally toroidal segment means cooperating with said second generally toroidal segment means to define a bifurcated diaphragm means extending generally between said first and second mounting means.

2. In a chain saw having:
   a vibrating assembly including a cutter chain and an engine drivingly connected therewith;
   a support means including handle means;
   resilient diaphragm means having an aperture;
   shaft means passing through said aperture of said diaphragm means, with said diaphragm means being journaled upon said shaft means;
   first, impedance means, mounted on said shaft means on one side of said diaphragm means; and
   second, impedance means, mounted on said shaft means on an opposite side of said diaphragm means;
   first mounting means connecting said diaphragm means with one of said vibrating assembly and said support means; and
   second mounting means connecting said shaft means with the other of said vibrating assembly and said support means;
   the improvement residing in said diaphragm means and comprising:
     resilient, generally annular base means telescopingly mounted on said shaft means and located on said shaft means generally axially between said first and second impedance means;
     first, resilient, generally toroidal segment means disposed generally outwardly of and supported by said generally annular base means and generally engageable with said first mounting means;
     second, resilient, generally toroidal segment means disposed generally outwardly of and supported by said generally annular base means and generally engageable with said first mounting means;
     generally annular, vibration and deflection-accommodating recess means located generally between said first and second generally toroidal segment means and encircling said generally annular base means;
     said first generally toroidal segment means cooperating with said second generally toroidal segment means to define a bifurcated diaphragm means extending generally between said first and second mounting means.

3. A chain saw as described in claim 2 wherein:
   said generally annular, vibration and deflection-accommodating recess means has a generally V-shaped cross-section in a plane extending longitudinally of said axis of said generally annular base means; and said first and second generally toroidal segment means respectively include first and second generally annular lip means disposed generally radially and axially outwardly of said resilient, generally annular base means and generally axially and radially engageable with said first mounting means.

4. A chain saw as described in claim 2 wherein:

said first mounting means comprises generally annular ring means including radially inwardly facing groove means located between first and second rim means, with said first and second rim means disposed axially outwardly of said first and second generally toroidal segment means, respectively, and axially engageable therewith;

the axial distance between the axial extremities of said first and second generally toroidal segment means is less than the axial distance between said first and second rim means;

the inner diameter of said resilient, generally annular base means exceeds the outer diameter of said shaft means and the outer diameter of each of said first and second generally toroidal segment means is less than the inner diameter of said first mounting means.

5. A chain saw as described in claim 2 wherein:

said resilient diaphragm means, while undergoing the imposition of force caused by relative radial movement between said shaft means and said first mounting means, is operable to resiliently absorb vibrations by at least partially radially directed torus bending of said first and second generally toroidal segment means, shear in said first and second generally toroidal segment means, hoop compression in said first and second generally toroidal segment means, generally axially directed compression acting on said first and second generally toroidal segment means; and said resilient diaphragm means, while undergoing the imposition of force caused by relative axial movement between said shaft means and said first mounting means, is operable to resiliently absorb vibrations by at least partially axially directed bending of at least one of said first and second generally toroidal segment means, shear in at least one of said first and second generally toroidal segment means, hoop tension in at least one of said first and second generally toroidal segment means, and generally axially directed compression acting on at least one of said first and second generally toroidal segment means.

6. A chain saw as described in claim 2 wherein:

said diaphragm means further includes generally annular, resilient bumper means, said generally resilient annular bumper means comprising resilient O-ring means encircling said generally annular base means and disposed generally axially between said first and second generally toroidal segment means, said O-ring means being operable to resiliently cushion radial movement induced engagement between said generally annular base means and said first mounting means.

7. A chain saw as described in claim 2 wherein:

said generally annular, vibration and deflection-accommodating recess means has a generally V-shaped cross-section in a plane extending longitudinally of said axis of said generally annular base means;

said first and second generally toroidal segment means respectively include first and second generally annular lip means disposed generally radially and axially outwardly of said resilient, generally annular base means and generally axially and radially engageable with said first mounting means;

said first mounting means comprises generally annular ring means including radially inwardly facing groove means located between first and second rim means, with said first and second rim means being disposed axially outwardly of said first and second generally toroidal segment means, respectively, and axially engageable therewith;

the axial distance between the axial extremities of said first and second generally toroidal segment means is less than the axial distance between said first and second rim means;

the inner diameter of said resilient, generally annular base means exceeds the outer diameter of said shaft means; and the outer diameter of each of said first and second generally toroidal segment means is less than the inner diameter of said first mounting means.

8. A chain saw as described in claim 2 wherein:

said generally annular, vibration and deflection-accommodating recess means has a generally V-shaped cross-section in a plane extending longitudinally of said axis of said generally annular base means;

said first and second generally toroidal segment means respectively include first and second generally annular lip means disposed generally radially and axially outwardly of said resilient, generally annular base means and generally axially and radially engageable with said first mounting means;

said first mounting means comprises generally annular ring means including radially inwardly facing groove means located between first and second rim means, with said first and second rim means being disposed axially outwardly of said first and second generally toroidal segment means, respectively, and axially engageable therewith;

the axial distance between the axial extremities of said first and second generally toroidal segment means is less than the axial distance between said first and second rim means; and said diaphragm means further includes generally annular, resilient bumper means, said generally annular, resilient bumper means comprising resilient O-ring means encircling said generally annular base means and disposed generally axially between said first and second generally toroidal segment means, said O-ring means being operable to resiliently cushion radial movement induced engagement between said generally annular base means and said first mounting means.

9. A chain saw described in claim 2 wherein:

said generally annular, vibration and deflection-accommodating recess means has a generally V- shaped cross-section in a plane extending longitudinally of said axis of said generally annular base means;

said first and second generally toroidal segment means respectively include first and second generally annular lip means disposed generally radially and axially outwardly of said resilient, generally annular base means and generally axially and radially engageable with said first mounting means;

said first mounting means comprises generally annular ring means including
radially inwardly facing groove means located between first and second rim means, with said first and second rim means being disposed axially outwardly of said first and second generally toroidal segment means, respectively, and axially engageable therewith;

the axial distance between the axial extremities of said first and second generally toroidal segment means is less than the axial distance between said first and second rim means;

said diaphragm means further includes generally annular, resilient bumper means, said generally annular, resilient bumper means comprising
resilient O-ring means encircling said generally annular base means and disposed generally axially between said first and second generally toroidal segment means,
said O-ring means being operable to resiliently cushion radial movement induced engagement between said generally annular base means and said first mounting means;

said resilient diaphragm means, while undergoing the imposition of force caused by relative radial movement between said shaft means and said first mounting means, is operable to resiliently absorb vibrations by
at least partially radially directed torus bending of said first and second generally toroidal segment means,
shear in said first and second generally toroidal segment means,
hoop compression in said first and second generally toroidal segment means,
generally axially directed compression acting on said first and second generally toroidal segment means; and said resilient diaphragm means, while undergoing the imposition of force cause by relative axial movement between said shaft means and said first mounting means, is operable to resiliently absorb vibrations by
at least partially axially directed bending of at least one of said first and second generally toroidal segment means,
shear in at least one of said first and second generally toroidal segment means,
hoop tension in at least one of said first and second generally toroidal segment means, and
generally axially directed compression acting on at least one of said first and second generally toroidal segment means.

10. A chain saw as described in claim 2 wherein:
said first, resilient, generally toroidal segment means includes
first, resilient, generally annular rim means spaced from said generally annular base means, and
first, resilient, cantilever means connected with said generally annular base means and resiliently supporting said first, resilient, generally annular rim means generally outwardly of a central axis of said generally annular base means; and
said second, resilient, generally toroidal segment means includes
second, resilient, generally annular rim means spaced from said generally annular base means, and
second, resilient, cantilever means resiliently supporting said second, resilient, generally annular rim means generally outwardly of said central axis of said generally annular base means,
said generally annular, vibration and deflection-accommodating recess means being located generally between said first and second, resilient, generally annular rim means; and
said first, resilient, generally annular rim means and first, resilient, cantilever means cooperating with said second, resilient, generally annular rim means and second, resilient, cantilever means to define said generally bifurcated diaphragm means.

11. In a vibration isolating unit comprising:
resilient diaphragm means having an aperture;
shaft means passing through said aperture of said diaphragm means, with said diaphragm means being journaled upon said shaft means;
first, impedance means, mounted on said shaft means on one side of said diaphragm means; and
second, impedance means, mounted on said shaft means on an opposite side of said diaphragm means;
the improvement residing in said diaphragm means and comprising:
resilient, generally annular base means telescopingly mounted on said shaft means and located on said shaft means generally axially between said first and second impedance means;
first, resilient, generally annular rim means spaced from said generally annular base means;
first, resilient, cantilever means connected with said generally annular base means and resiliently supporting said first, resilient, generally annular rim means generally outwardly of a central axis of said generally annular base means;
second, resilient, generally annular rim means spaced from said generally annular base means;
second, resilient, cantilever means resiliently supporting said second, resilient, generally annular rim means generally outwardly of said central axis of said generally annular base means; and
generally annular, vibration and deflection-accommodating recess means located generally between said first and second, resilient, generally annular rim means;
said first, resilient, generally annular rim means and first, resilient, cantilever means cooperating with said second, resilient, generally annular rim means and second, resilient, cantilever means to define a generally bifurcated diaphragm means.

12. A vibration isolating unit as described in claim 11 wherein:
said first, resilient, generally annular rim means and said first, resilient, cantilever means cooperate to define first, resilient, generally toroidal segment means;

said second, resilient, generally annular rim means and said second, resilient, cantilever means cooperate to define second, resilient, generally toroidal segment means; and said first and second, resilient, generally toroidal segment means are disposed on generally opposite sides of said recess means, are mutually diverging, and cooperate to define said generally bifurcated diaphragm means.

13. A vibration isolating unit as described in claim 12 wherein:

said unit is operable to be mounted in mounting means comprising
first mounting means connected with said diaphragm means and connected with one of two, relatively moveable means, and
second mounting means connected with said generally annular base means connected with the other of said two, relatively moveable means;
said generally annular, vibration and deflection-accommodating recess means has a generally V-shaped cross-section in a plane extending longitudinally of said axis of said generally annular base means; and
said first and second resilient, annular rim means of said first and second generally toroidal segment means respectively comprise first and second generally annular lip means
disposed generally radially and axially outwardly of said resilient, generally annular base means and generally axially and radially engageable with said first mounting means.

14. A vibration isolating unit as described in claim 13 wherein:

said first mounting means comprises generally annular ring means including
radially inwardly facing groove means located between first and second rim means, with said first and second rim means being disposed axially outwardly of said first and second generally annular lip means, respectively, and axially engageable therewith; and
the axial distance between the axial extremities of said first and second generally annular lip means is less than the axial distance between said first and second rim means.

15. A vibration isolating unit as described in claim 14 wherein:

said resilient diaphragm means, while undergoing the imposition of force caused by relative radial movement between said second mounting means and said first mounting means, is operable to resiliently absorb vibrations by
torus bending,
shear,
hoop compression,
axial compression; and
said resilient diaphragm means, while undergoing the imposition of force caused by relative axial movement between said second mounting means and said first mounting means, is operable to resiliently absorb vibrations by
torus bending,
shear,
hoop tension, and
axial compression.

16. A vibration isolating unit as described in claim 15 wherein:

said diaphragm means further includes generally annular, resilient bumper means, said generally resilient, annular bumper means comprising
resilient cushioning means generally encircling said generally annular base means and disposed generally axially between said first and second generally toroidal segment means,
said cushioning means being operable to resiliently cushion radial movement induced engagement between said generally annular base means and said first mounting means.

* * * * *